(12) United States Patent
Yamada et al.

(10) Patent No.: US 10,490,790 B2
(45) Date of Patent: Nov. 26, 2019

(54) BATTERY MODULE

(71) Applicant: KABUSHIKI KAISHA TOYOTA JIDOSHOKKI, Aichi (JP)

(72) Inventors: Masahiro Yamada, Aichi (JP); Hiromi Ueda, Aichi (JP); Hirokuni Akiyama, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 16/083,154

(22) PCT Filed: Nov. 8, 2016

(86) PCT No.: PCT/JP2016/083106
§ 371 (c)(1),
(2) Date: Sep. 7, 2018

(87) PCT Pub. No.: WO2017/158915
PCT Pub. Date: Sep. 21, 2017

(65) Prior Publication Data
US 2019/0097191 A1   Mar. 28, 2019

(30) Foreign Application Priority Data
Mar. 15, 2016 (JP) ................. 2016-051171

(51) Int. Cl.
*H01M 2/10* (2006.01)
*H01M 2/20* (2006.01)
(Continued)

(52) U.S. Cl.
CPC ....... *H01M 2/1077* (2013.01); *H01M 2/1022* (2013.01); *H01M 2/202* (2013.01); *H01M 10/482* (2013.01); *H01M 10/425* (2013.01)

(58) Field of Classification Search
CPC ............ H01M 2/20; H01M 2/10; H01M 2/02; H01M 10/48
See application file for complete search history.

(56) References Cited

U.S. PATENT DOCUMENTS 5,319,844 A * 6/1994 Huang ................. H02K 1/06
29/598
5,643,693 A * 7/1997 Hill ................. H01M 2/1083
429/121
(Continued)

FOREIGN PATENT DOCUMENTS

CN    101192676    6/2008
CN    103891007    6/2014
(Continued)

OTHER PUBLICATIONS

English translation of International Preliminary Report on Patentability for PCT/JP2016/083106 dated Sep. 27, 2018.
(Continued)

*Primary Examiner* — Kenneth J Douyette
(74) *Attorney, Agent, or Firm* — Greenblum & Bernstein, P.L.C.

(57) ABSTRACT

Provided is a battery module, which includes an array for battery cells, an elastic body disposed with respect to the array, a restraining member that restrains the array via the elastic body in an arranging direction of the battery cells, a plurality of harnesses that extend in the arranging direction and have connecting terminals of tips thereof connected to electrode terminals of the predetermined battery cells, and a binding member that binds the plurality of harnesses into a harness bundle. A binding position of the harnesses which is caused by the binding member is located at a side opposite to the elastic body relative to a connecting position between the electrode terminal and the connecting terminal, and the (Continued)

harness that branches off from the binding member has a flexure between the binding position and the connecting position.

11 Claims, 10 Drawing Sheets

(51) Int. Cl.
*H01M 10/48* (2006.01)
*H01M 10/42* (2006.01)

(56) References Cited

U.S. PATENT DOCUMENTS

2008/0280194 A1  11/2008  Okada
2014/0216805 A1* 8/2014  Adachi ............... H01B 7/182
                                                    174/350
2014/0295225 A1  10/2014 Okamoto et al.
2017/0288197 A1  10/2017 Yamada et al.

FOREIGN PATENT DOCUMENTS

| | | |
|---|---|---|
| JP | 2008-243412 | 10/2008 |
| JP | 2013-55069 | 3/2013 |
| JP | 2016-62800 | 4/2016 |
| JP | 2016-115615 | 6/2016 |

OTHER PUBLICATIONS

Written Opinion of the ISA issued in International Patent Application No. PCT/JP2016/083106, dated Jan. 31, 2017, along with an English translation thereof.

English tranlsation of International Search Report issued in International Patent Application No. PCT/JP2016/083106, dated Jan. 31, 2017.

* cited by examiner

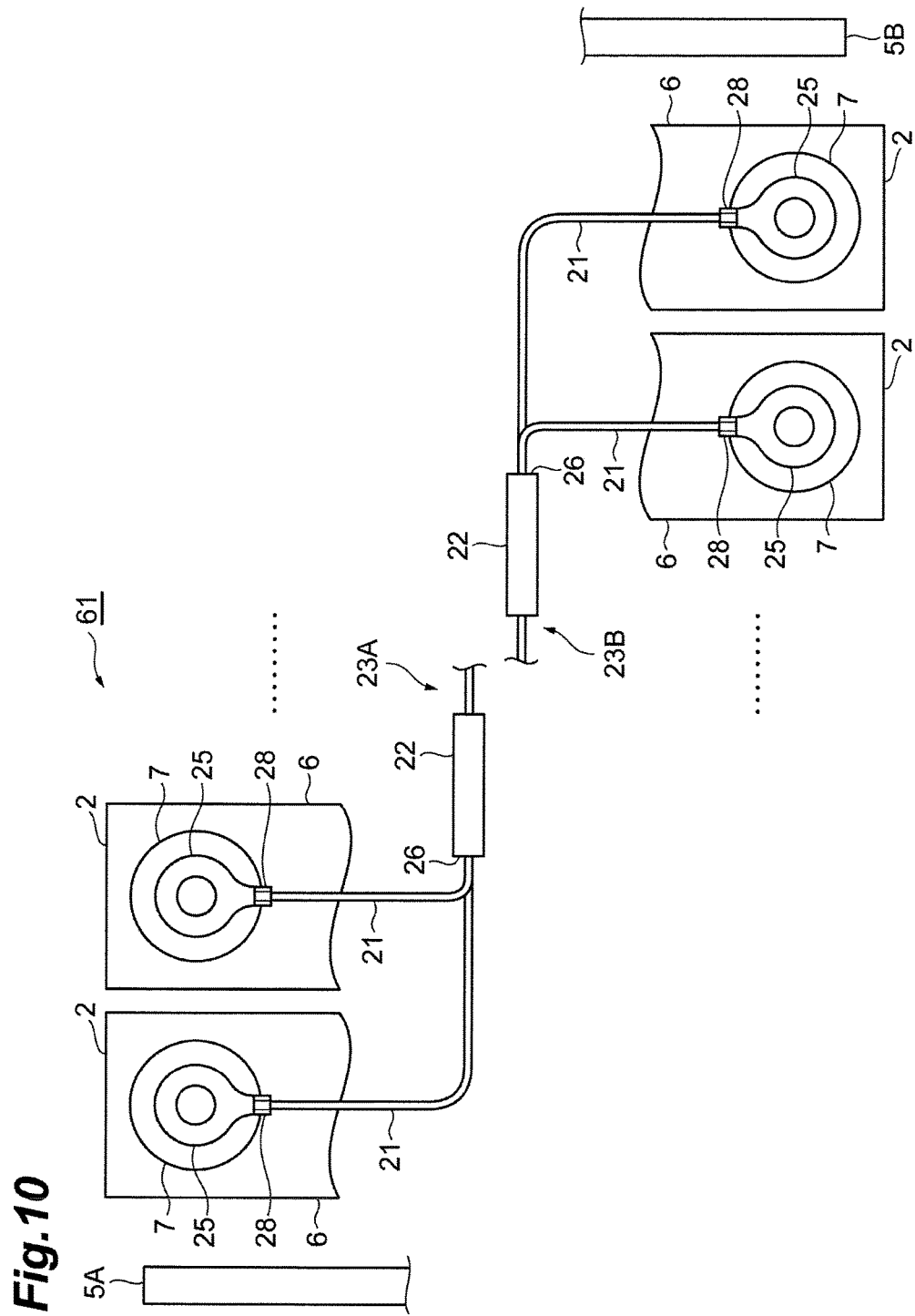

BATTERY MODULE

TECHNICAL FIELD

An aspect of the present invention relates to a battery module.

BACKGROUND ART

Conventionally, a battery module formed by arranging a plurality of battery cells such as, for instance, a lithium-ion secondary battery is known. In such a battery module, an array of battery cells is sandwiched between restraints such as metal plates, and is restrained under a fixed load. Thereby, a variation in characteristics such as internal resistance in the battery cells is reduced. For example, in a battery pack set forth in Patent Literature 1, a metal band having bent parts at opposite ends thereof is fixed to an end plate, and a battery block is restrained in a laminating direction by the end plate. In this battery module, for the purpose of preventing damage to a restraining member due to swelling of the battery cells, an elastic body such as rubber may be interposed between the array and the end plate of the restraining member.

Harnesses used for voltage detection or the like in the battery cells may be assembled in the battery module. For example, in a battery pack set forth in Patent Literature 2, a connector having voltage detection terminals is held by a holding member, and the holding member is mounted on a battery group. Thereby, the connector may be collectively electrically connected to electrode terminals of these battery cells.

CITATION LIST

Patent Literature

[Patent Literature 1] Japanese Unexamined Patent Publication No. 2013-055069
[Patent Literature 2] Japanese Unexamined Patent Publication No. 2008-243412

SUMMARY OF INVENTION

Technical Problem

When the harnesses are assembled in the battery module, it is necessary to avoid complexity of wiring of the harnesses. For this reason, the vicinities of proximal ends of the plurality of harnesses are bound by binding members, and the harnesses are preferably assembled in the battery module in a state of being in a harness bundle. When connecting terminals of distal ends of the harnesses are connected to the electrode terminals of the battery cells, lengths of the harnesses branching off in the vicinities of distal ends of the binding members may also be made different from each other to prevent connecting destinations from being mistaken.

Meanwhile, a gas may be generated inside a case due abnormalities such as overcharge, or the battery cell may swell due to deterioration over time. When swelling occurs in the battery cell, it is thought that a connecting position between the electrode terminal of each battery cell and the connecting terminal of each harness may move relative to a binding position of the harness bundle. In this case, when the lengths of the harnesses branching off the vicinities of distal ends of the binding members are insufficient, there is concern that a load may be applied to each harness and cause a failure such as disconnection.

The present invention was devised to solve these problems, and is directed to providing a battery module capable of reducing a load applied to a harness even if swelling occurs in a battery cell.

Solution to Problem

A battery module according to an aspect of the present invention includes: an array formed by arranging a plurality of battery cells; an elastic body disposed with respect to the array; a restraining member configured to restrain the array via the elastic body in an arranging direction of the battery cells; a plurality of harnesses configured to extend in the arranging direction and have connecting terminals of tips thereof connected to electrode terminals of the predetermined battery cells; and a binding member configured to bind the plurality of harnesses into a harness bundle. A binding position of the harnesses which is caused by the binding member is located at a side opposite to the elastic body relative to a connecting position between the electrode terminal and the connecting terminal, and the harness that branches off from the binding member has a flexure between the binding position of the harnesses which is caused by the binding member and the connecting position between the electrode terminal and the connecting terminal.

In the battery module, the harness that branches off from the binding member has a flexure between the binding position of the harnesses which is caused by the binding member and the connecting position between the electrode terminal and the connecting terminal. For this reason, even when swelling occurs in the battery cell, and the connecting position between the electrode terminal of the battery cell and the connecting terminal of the harness moves relative to the binding position of the harness, a length of the harness branching off in the vicinity of a distal end of the binding member can be prevented from becoming insufficient. Therefore, a load can be inhibited from being applied to the harness, and the occurrence of a failure such as disconnection can be prevented. In the battery module, the binding position of the harnesses which is caused by the binding member is located at a side opposite to the elastic body relative to the connecting position between the electrode terminal and the connecting terminal. Thereby, a flexure amount of the harness branching off from the binding member can be sufficiently secured.

Further, the elastic body may be disposed at one arrangement end of the array for the battery cells, and the plurality of harnesses may be led from the other arrangement end of the array for the battery cells toward the elastic body. In this mode, the flexure amount of the harness branching off from the binding member can be sufficiently secured, and the occurrence of a failure such as disconnection can be prevented.

Further, the elastic body may be disposed between the battery cells in the array, and the plurality of harnesses may be led from one arrangement end and the other arrangement end of the array for the battery cells toward the elastic body. In this mode, the flexure amount of the harness branching off from the binding member can be sufficiently secured, and the occurrence of a failure such as disconnection can be prevented.

Further, the elastic body may be disposed at one arrangement end and the other arrangement end of the array for the battery cells, and the plurality of harnesses may be led from the other arrangement end toward the elastic body disposed at the one arrangement end. In this mode, the flexure amount of the harness branching off from the binding member can be sufficiently secured, and the occurrence of a failure such as disconnection can be prevented.

Further, the elastic body may be disposed at one arrangement end and the other arrangement end of the array for the battery cells, and the plurality of harnesses may be led from a middle portion of the array in the arranging direction toward the elastic body disposed at the one arrangement end and toward the elastic body disposed at the other arrangement end. In this mode, the flexure amount of the harness branching off from the binding member can be sufficiently secured, and the occurrence of a failure such as disconnection can be prevented.

Further, a deformation amount of the elastic body disposed at the one arrangement end when the battery cell swells may be greater than that of the elastic body disposed at the other arrangement end when the battery cell swells. In this mode, the flexure amount of the harness branching off from the binding member can be sufficiently secured, and the occurrence of a failure such as disconnection can be prevented.

Further, as the battery cell at a connecting destination of the harness becomes closer to the elastic body, a flexure amount of the harness that branches off from the binding member may increase.

When swelling occurs in the battery cell, an amount by which the connecting position between the electrode terminal of the battery cell and the connecting terminal of the harness moves relative to the binding position of the harnesses increases as the battery cell becomes located closer to the elastic body. Therefore, as the battery cell at the connecting destination of the harness becomes closer to the elastic body, the flexure amount of the harness that branches off from the binding member increases. Thereby, even when the connecting position between the electrode terminal of the battery cell and the connecting terminal of the harness moves relative to the binding position of the harnesses, the length of the harness branching off in the vicinity of the distal end of the binding member can be more reliably prevented from being insufficient.

Further, a mark indicating the binding position caused by the binding member may be provided for each of the harnesses. In this case, when the harnesses are assembled in the battery module, the binding position of the harnesses which is caused by the binding member can be easily perceived. Therefore, a variation in a binding range for each harness can be reduced, and the length of the harness branching off in the vicinity of the distal end of the binding member can be more reliably secured.

Further, the harnesses may be harnesses used to detect voltages of the battery cells. The disposition of the aforementioned harnesses is suitable for that of the harnesses used to detect voltages of the battery cells.

Effects of Invention

According to the present invention, even when swelling occurs in a battery cell, a load applied to a harness can be reduced.

BRIEF DESCRIPTION OF DRAWINGS

FIG. 10 is an enlarged schematic view of key parts illustrating an assembled state of harnesses of a battery module according to a fifth embodiment.

DESCRIPTION OF EMBODIMENTS

Hereinafter, a preferred embodiment of a battery module according to an aspect of the present invention will be described in detail with reference to the drawings.

First Embodiment

Figure 1:
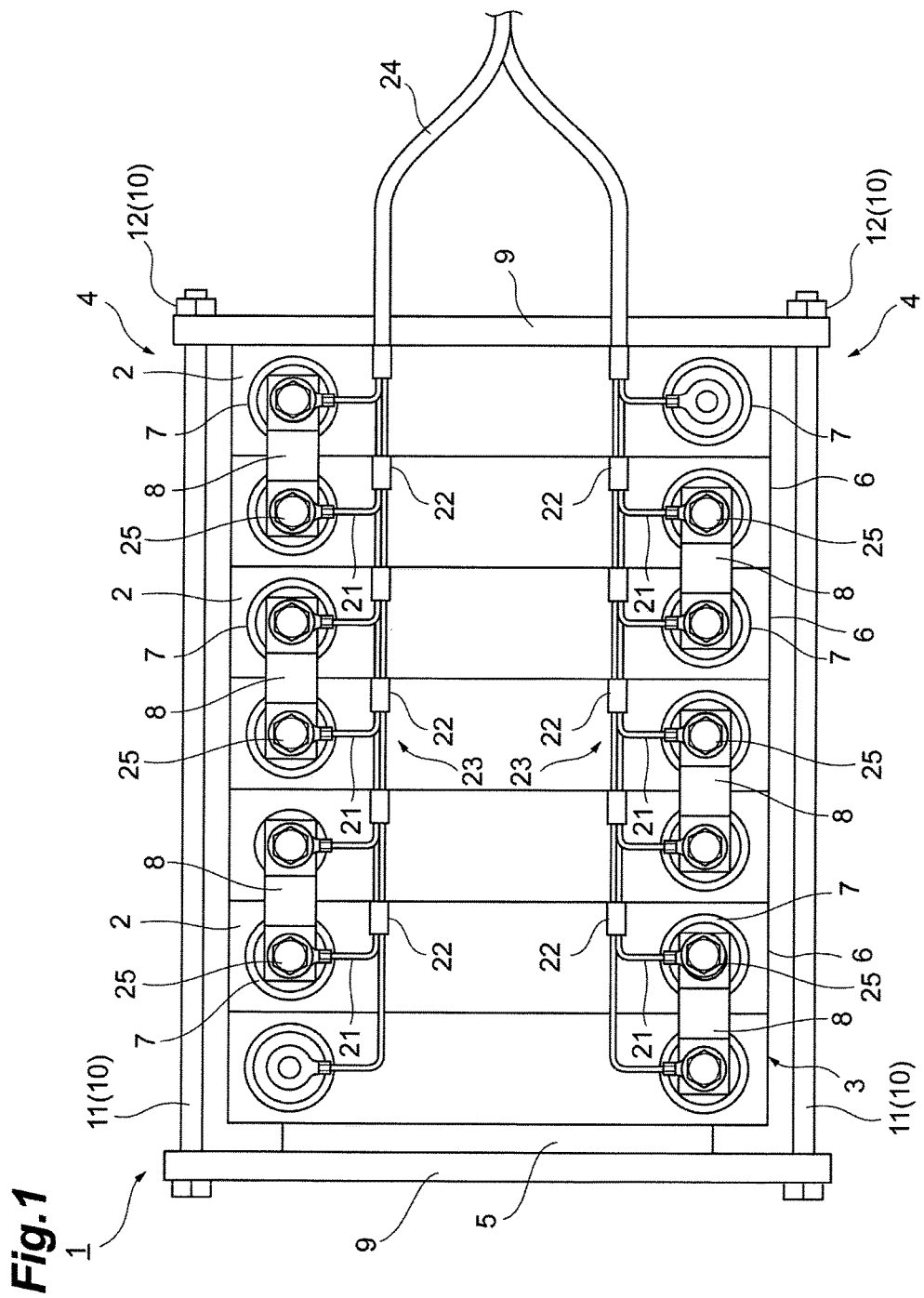
FIG. 1 is a top view illustrating a battery module according to a first embodiment.

FIG. 1 is a top view illustrating a battery module according to a first embodiment. As illustrated in FIG. 1, a battery module 1 includes an array 3 that is formed by arranging a plurality of battery cells 2, a restraining member 4 that applies a restraining load to the array 3 in an arranging direction of the battery cells 2, and an elastic body 5 that is interposed between the array 3 and the restraining member 4.

The array 3 is made up of, for instance, seven battery cells 2. A heat transfer plate (not shown) is interposed between the battery cells 2 and 2. Each battery cell 2 is, for instance, a lithium-ion secondary battery. Each battery cell 2 is formed by housing an electrode assembly and an electrolyte in a hollow case 6 that has, for instance, an approximately rectangular parallelepiped shape.

A pair of electrode terminals 7 and 7 are provided apart from each other on the top of the case 6. One of the electrode terminals 7 is a positive electrode terminal that is connected to a positive electrode of the electrode assembly, and the other of the electrode terminals 7 is a negative electrode terminal that is connected to a negative electrode of the electrode assembly. The adjacent battery cells 2 and 2 are arranged such that the positive electrode terminal and the negative electrode terminal are adjacent to each other, and the adjacent positive and negative electrode terminals are connected by a bus bar member 8, and are thereby connected electrically in series.

The restraining member 4 includes a pair of end plates 9 and 9, and fastening members 10 that fasten the end plates 9 and 9. The end plates 9 are each formed of, for instance, a metal such as iron in a flat plate shape, and are disposed to sandwich the array 3 and the elastic body 5 in the arranging direction.

Each fastening member 10 is made up of a long bolt 11, and a nut 12 screwed to the bolt 11. The bolt 11 is inserted from one of the end plates 9 into the other end plate 9 to connect outer edge portions of the end plates 9. The nut 12 is screwed to a tip of the bolt 11 from the outside of the end plate 9. Thereby, the battery cells 2, the elastic body 5, and the heat transfer plates are sandwiched and unitized, and a restraining load is applied.

The elastic body 5 is a member that is used to prevent damage to restraining components in addition to preventing damage to the battery cells 2 due to the restraining load. The elastic body 5 is formed of, for instance, a rubber sponge made of urethane in a rectangular plate shape. The elastic body 5 is disposed close to the battery cell 2 at one arrangement end of the array 3. Other examples of a material of which the elastic body 5 is formed include, for instance, ethylene propylene diene rubber (EPDM), chloroprene rubber, silicone rubber or the like. The material of the elastic body 5 may be a spring member without being limited to rubber.

A plurality of harnesses 21 used to detect voltages of the battery cells 2 are assembled in the battery module 1. The plurality of harnesses 21 are bound into a harness bundle 23 by binding members 22, and are distributed in the arranging direction of the battery cells 2 in this state. In the present embodiment, a pair of harness bundles 23 and 23 are led from the vicinity of the other arrangement end of the array 3 toward the elastic body 5 along a row of one electrode terminals 7 of the battery cells 2 and a row of the other electrode terminals 7 of the battery cells 2, respectively.

The vicinities of proximal ends of the harness bundles 23 and 23 coated with coating members 24, are joined outside the battery module 1 in this state, and are electrically connected to, for instance, a voltmeter (not shown) disposed above the battery module 1. Each coating member 24 also has a function as a binding member, and the harnesses 21 branch off at ends of the coating members 24 and the binding members 22 in the vicinities of distal ends of the harness bundles 23 and 23. Connecting terminals 25 are provided at tips of the harnesses 21 that have branched off, and the connecting terminals 25 are connected to the electrode terminals 7 of predetermined battery cells 2. Thereby, electrical connection between the harness 21 and the battery cell 2 is made.

Figure 2:
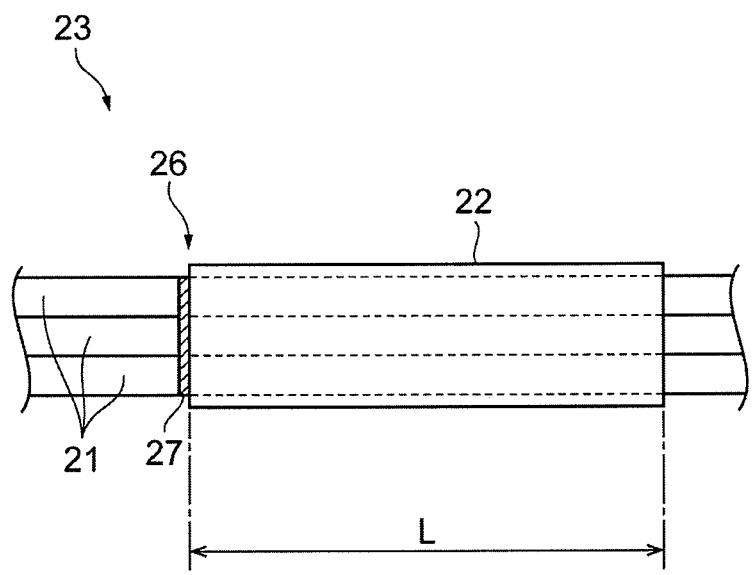
FIG. 2 is a schematic view illustrating an example of a harness bundle.

As illustrated in FIG. 2, the binding member 22 is formed of, for instance, a resin tape or a resin tube. A length L of the binding member 22 can be set to an arbitrary length without obstructing disposition of the harnesses 21 that branch off from the other binding members 22. A mark 27 that indicates a binding position 26 caused by the binding member 22 (a position of a distal end of the binding member 22) is provided on the harnesses 21 that are bound by the binding member 22. The mark 27 is not particularly limited, but for instance, a resin tape or a resin tube may be used, or paint may be applied or printed. In addition, the mark 27 may be formed by a groove or a recess.

Figure 3:
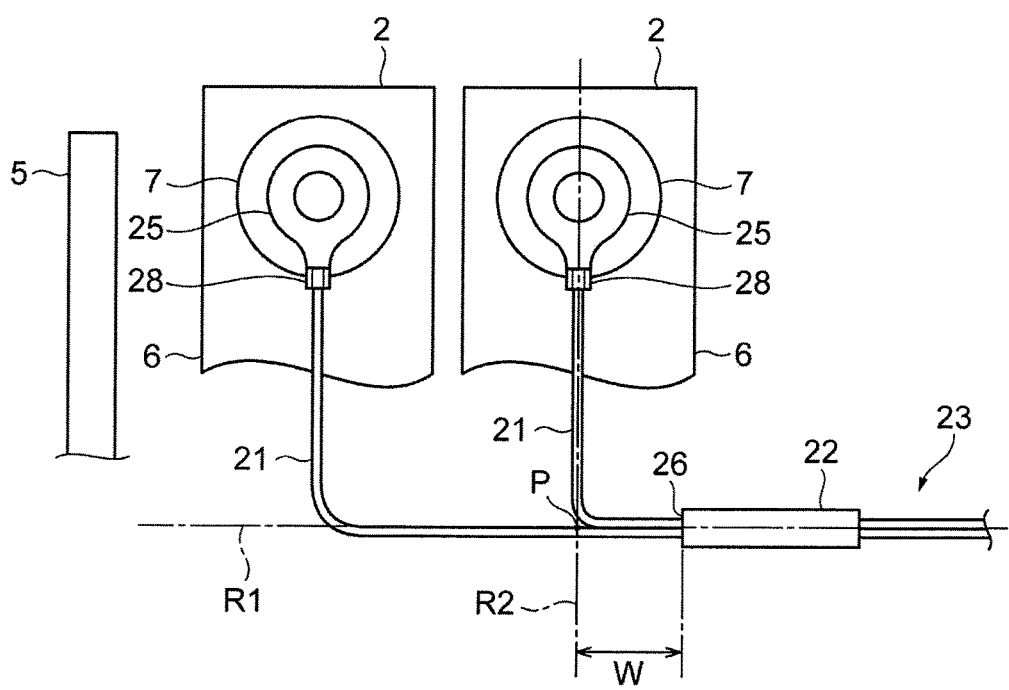
FIG. 3 is an enlarged schematic view of key parts illustrating an assembled state of harnesses.

FIG. 3 is a schematic view illustrating a state of the harness that branches off from the binding member. In FIG. 3, the harness 21 connected to the battery cell 2 that is located closest to the elastic body 5 and the harness 21 connected to the battery cell that is adjacent to the battery cell 2 that is located closest to the elastic body 5 are illustrated. The other harnesses 21 have the same configuration. As illustrated in FIG. 3, in the battery module 1, the harnesses 21 that branch off from the binding member 22 have flexures between the binding position 26 of the harnesses 21 which is caused by the binding member 22 and the connecting position 28 between the electrode terminal 7 and the connecting terminal 25.

To be more specific, in the battery module 1, the binding position 26 of the harnesses 21 and 21 which is caused by the binding member 22 is located at the side opposite to the elastic body 5 at a predetermined distance W from an intersection P at which a segment R1 in an extending direction of the harness bundle 23 and a segment R2 that connects the centers of the electrode terminals 17 and 17 of the battery cells 2 intersect each other. Thereby, a length of the harness 21 from the binding position 26 to the connecting position 28 is longer than a shortest distance (a distance connected by a straight line) between the binding position 26 and the connecting position 28, and the harness 21 that branches off from the binding member 22 has a flexure between the binding position 26 and the connecting position 28. The predetermined distance W is appropriately set depending on a thickness of the case 6 of the battery cell 2 or a type of the harness 21, and is preferably set in consideration of a swelling amount of the battery cell 2 (this will be described below).

Figure 4:
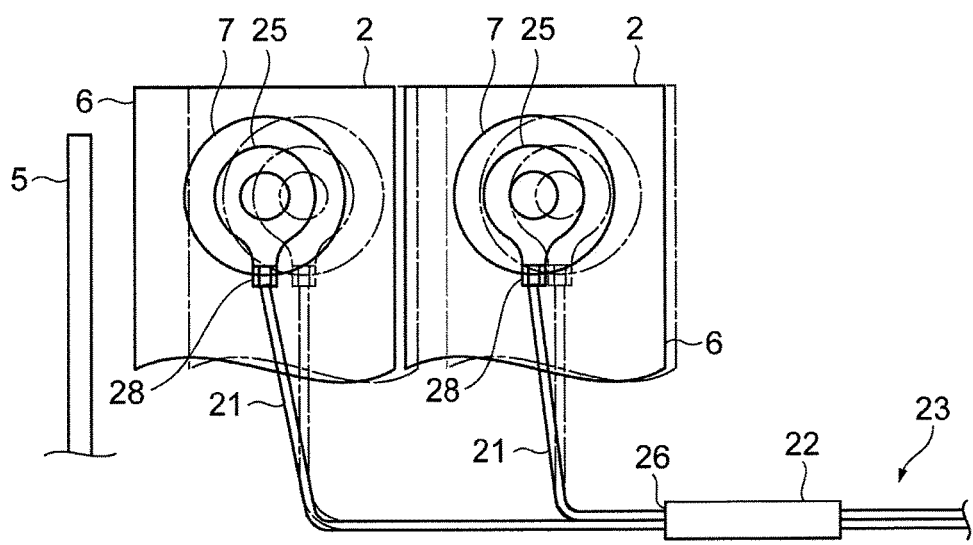
FIG. 4 is an enlarged schematic view of key parts illustrating the assembled state of the harnesses in the event of swelling of a battery cell.

FIG. 4 is a view illustrating operation and effects of the harnesses 21 illustrated in FIG. 3. In the battery module 1, as described above, the elastic body 5 is disposed at one arrangement end of the array 3 of the battery cells 2. Thus, when swelling occurs in the battery cell 2, the array 3 is displaced from an initial position within a compressible range of the elastic body 5 toward the vicinity of the elastic body 5 in one direction. With the displacement of the array 3, the connecting position 28 between the electrode terminal 7 and the connecting terminal 25 in each battery cell 2 is also displaced from the initial position toward the vicinity of the elastic body 5 in the one direction.

With respect to the movement of this connecting position 28, in the battery module 1, the binding position 26 of the harnesses 21 which is caused by the binding member 22 is located at the side opposite to the elastic body 5 relative to the connecting position 28 between the electrode terminal 7 and the connecting terminal 25, and the harness 21 branching off from the binding member 22 has a flexure between the binding position 26 and the connecting position 28. Therefore, even when the connecting position 28 moves to the vicinity of the elastic body 5 from the initial position, the length of the harness 21 branching off from the binding member 22 is prevented from being insufficient, and the flexure of the harness 21 is maintained. Since the flexure of the harness 21 is maintained, an excessive load such as a tensile force can be prevented from being applied to the harness 21, and thus the occurrence of a failure such as disconnection is prevented.

Figure 5:
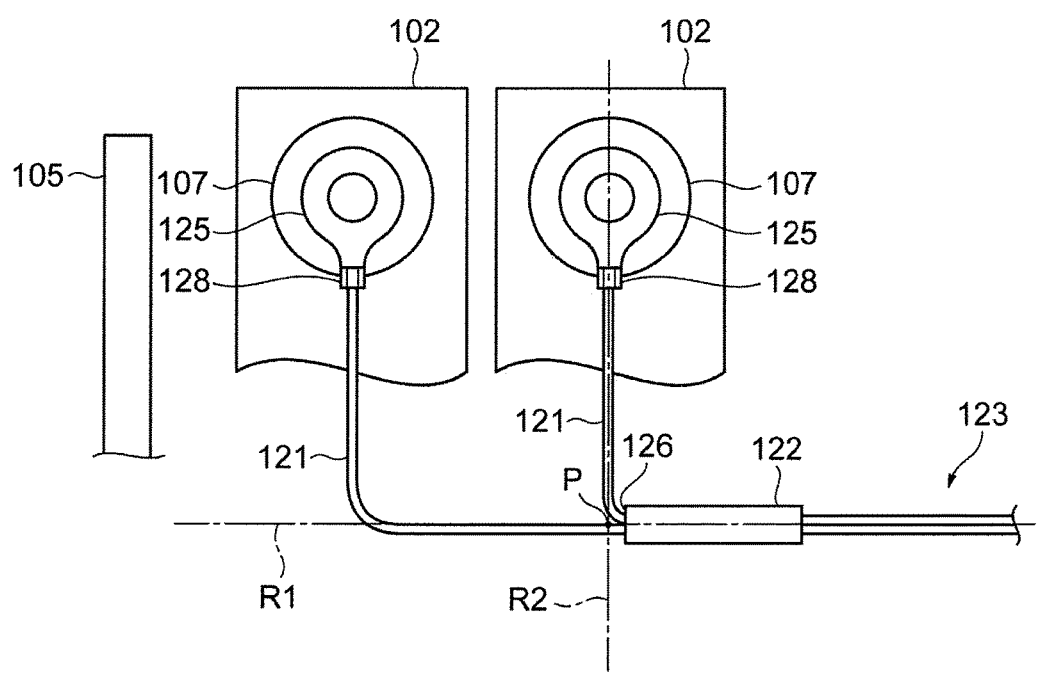
FIG. 5 is an enlarged schematic view of key parts illustrating an assembled state of harnesses according to a comparative example.

FIG. 5 is an enlarged schematic view of key parts illustrating an assembled state of harnesses according to a comparative example. As illustrated in FIG. 5, in a comparative example, a position of a binding member 122 in a harness bundle 123 is different from that of FIG. 3, and a binding position 126 of harnesses 121 which is caused by the binding member 122 and a connecting position 128 between an electrode terminal 107 of a battery cell 102 and a connecting terminal 125 of the harness 121 are in an aligned state. That is, the binding position 126 of the harnesses 121 which is caused by the binding member 122 is nearly identical to an intersection P at which a segment R1 in an extending direction of the harness bundle 123 and a segment R2 connecting the centers of electrode terminals 107 and 107 of the battery cells 102 intersect each other. Thus, a length of the harness 121 branching off from the binding position 126 is nearly identical to a distance from the binding position 126 to the connecting position 128.

Figure 6:
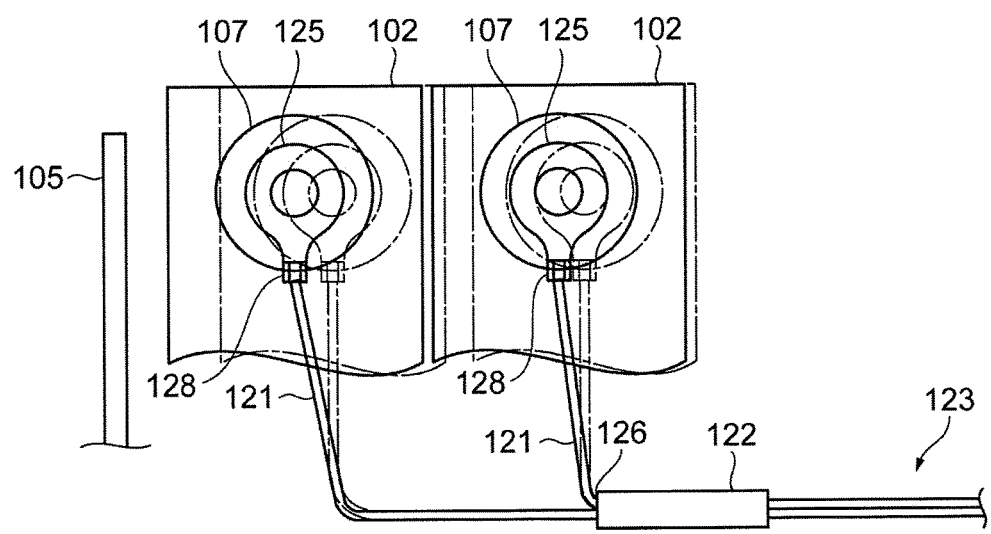
FIG. 6 is an enlarged schematic view of key parts illustrating the assembled state of the harnesses in the event of swelling of a battery cell in the case of the comparative example.

In the configuration of this comparative example, it can be understood that the length of the harness 121 is insufficient for movement of the connecting position 128 when swelling occurs at the battery cell 102 and an elastic body 105 is compressed. When the length of the harness 121 is insufficient, there is concern that, as illustrated in FIG. 6, a load caused by a tensile force may be applied to the harness 121, and a failure such as disconnection may occur in the harness 121. Therefore, as illustrated in FIG. 3, providing a flexure for the harness 21 branching off from the binding member 22 is suitable for preventing a failure such as disconnection.

When swelling occurs in the battery cells 2, as the battery cells 2 become closer to the vicinity of the elastic body 5, since the swelling amounts of the battery cells 2 are additive, an amount by which the connecting position 28 between the electrode terminal 7 and the connecting terminal 25 moves relative to the binding position 26 of the harnesses 21 increases (see FIG. 4). Therefore, as the battery cells 2 at connecting destinations of the harnesses 21 become located closer to the elastic body 5, flexure amounts of the harnesses 21 that branch off from the binding members 22 preferably increase.

For example, when the battery cell 2 at the connecting destination of the harness 21 is located in the vicinity of the elastic body 5, the distance W between the binding position 26 and the intersection P may be increased. By adopting this configuration, even when the connecting position 28 moves relative to the binding position 26 due to swelling of the battery cell 2, the length of the harness 21 branching off in the vicinity of the distal end of the binding member 22 can be more reliably prevented from being insufficient.

In the battery module 1, the mark 27 that indicates the binding position 26 caused by the binding member 22 is provided on the harnesses 21 (see FIG. 2). Due to this mark 27, when the harnesses 21 are assembled in the battery module 1, the binding position 26 of the harnesses 21 which is caused by the binding member 22 can be easily perceived. Therefore, a variation in a binding range for each harness 21 can be reduced, and the length of the harness 21 branching off in the vicinity of the distal end of the binding member 22 can be more reliably secured.

Second Embodiment

Figure 7:
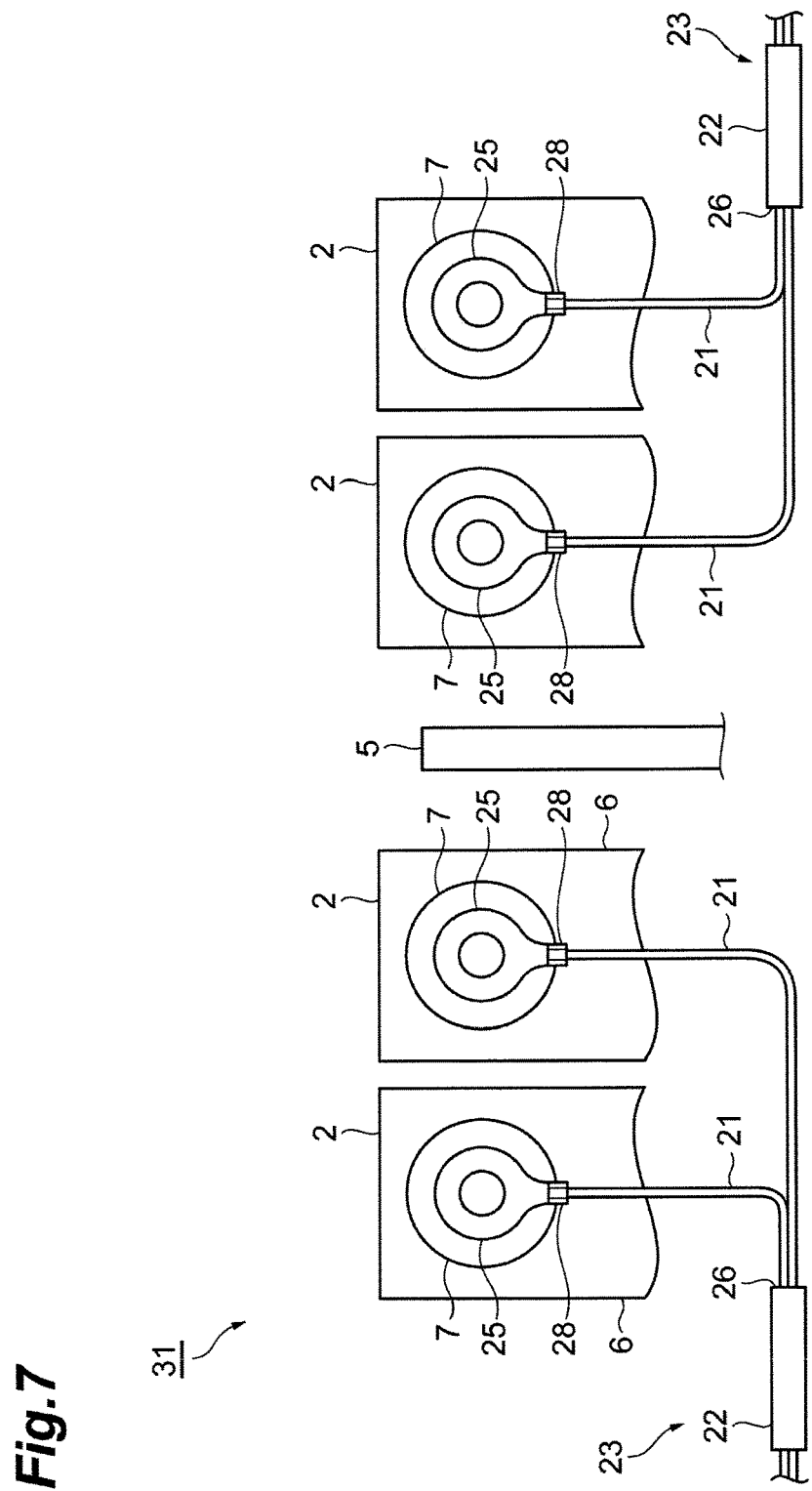
FIG. 7 is an enlarged schematic view of key parts illustrating an assembled state of harnesses of a battery module according to a second embodiment.

FIG. 7 is an enlarged schematic view of key parts illustrating an assembled state of harnesses of a battery module according to a second embodiment. As illustrated in FIG. 7, a battery module 31 according to a second embodiment is different from the battery module according to the first embodiment with regard to a position at an elastic body 5 is disposed and positions at which harness bundles 23 are led.

To be more specific, in the battery module 31, the elastic body 5 is disposed between battery cells 2 and 2 rather than an arrangement end of an array 3. The harness bundles 23 are led from one arrangement end and the other arrangement end of the array 3 for the battery cells 2 toward the elastic body 5.

In the battery module 31, a binding position 26 of harnesses 21 which is caused by a binding member 22 is located at a side opposite to the elastic body 5 relative to a connecting position 28 between an electrode terminal 7 and a connecting terminal 25, and the harness 21 branching off from the binding member 22 has a flexure between the binding position 26 and the connecting position 28. Therefore, like the aforementioned embodiment, even when swelling occurs at the battery cell 2, and the connecting position 28 moves to the vicinity of the elastic body 5 from an initial position, the flexure of the harness 21 is maintained, and an excessive load such as a tensile force can be prevented from being applied to the harness 21, and thus the occurrence of a failure such as disconnection is prevented.

In the battery module 31, as the battery cell 2 at a connecting destination of the harness 21 is located closer to the elastic body 5, a distance W between the binding position 26 and an intersection P may be increased. Thereby, a length of the harness 21 branching off in the vicinity of the distal end of the binding member 22 when the battery cell 2 swells can be more reliably prevented from being insufficient.

Third Embodiment

Figure 8:
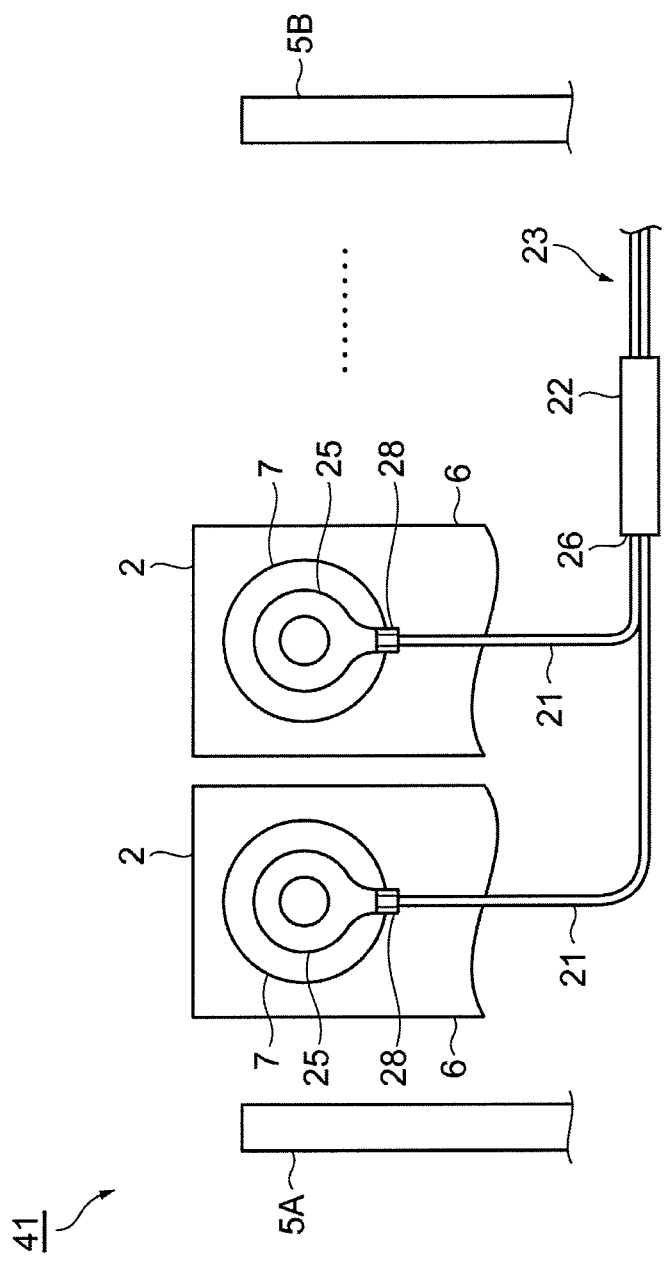
FIG. 8 is an enlarged schematic view of key parts illustrating an assembled state of harnesses of a battery module according to a third embodiment.

FIG. 8 is an enlarged schematic view of key parts illustrating an assembled state of harnesses of a battery module according to a third embodiment. As illustrated in FIG. 8, a battery module 41 according to a third embodiment is different from the battery module according to the first embodiment in that a plurality of elastic bodies 5 are disposed.

To be more specific, in the battery module 41, an elastic body 5A is disposed at one arrangement end of an array 3, and an elastic body 5B is disposed at the other arrangement end of the array 3. A harness bundle 23 is led from the other arrangement end of the array 3 toward the elastic body 5A.

In the battery module 41, a binding position 26 of harnesses 21 which is caused by a binding member 22 is located at a side opposite to the elastic body 5A, which is disposed on the one arrangement end, relative to a connecting position 28 between an electrode terminal 7 and a connecting terminal 25, and the harness 21 branching off from the binding member 22 has a flexure between the binding position 26 and the connecting position 28. Therefore, like the aforementioned embodiments, even when swelling occurs at the battery cell 2, and the connecting position 28 is displaced from an initial position to the vicinity of the elastic body 5A, the flexure of the harness 21 is maintained, and an excessive load such as a tensile force can be prevented from being applied to the harness 21, and thus the occurrence of a failure such as disconnection is prevented.

In the battery module 41, a deformation amount of the elastic body 5A when the battery cell 2 swells (a crushing amount in a restraining direction of the battery cell 2) may be equal to or greater than a deformation amount of the elastic body 5B when the battery cell 2 swells. The deformation amounts of the elastic bodies 5A and 5B when the battery cell 2 swells depend on an initial thickness of the elastic body (a thickness in a state in which a restraining load is applied) and a compression ratio of a material of which the elastic body is formed.

In the former case, when swelling occurs at the battery cell 2, the connecting position 28 in the battery cell 2 close to the one arrangement end is displaced from an initial position to the vicinity of the elastic body 5A in association with compression of the elastic body 5A, and the connecting position 28 in the battery cell 2 close to the other arrangement end is displaced from an initial position to the vicinity of the elastic body 5B in association with compression of the elastic body 5B. The connecting position 28 is hardly displaced at the battery cell 2 around the middle of the array 3.

Similarly in the latter case, when swelling occurs in the battery cell 2, the connecting position 28 in the battery cell 2 close to the one arrangement end is displaced from the initial position to the vicinity of the elastic body 5A in association with the compression of the elastic body 5A, and the connecting position 28 in the battery cell 2 close to the other arrangement end is displaced from the initial position to the vicinity of the elastic body 5B in association with the compression of the elastic body 5B. However, a position of the battery cell 2 at which the connecting position 28 hardly changes becomes closer to the elastic body 5B than in the former case.

In either case, as the battery cells 2 at the connecting destinations of the harnesses 21 become located closer to the elastic bodies 5A and 5B, flexure amounts of the harnesses 21 that branch off from the binding member 22 may increase. In this case, the flexure amount of the harness 21 that branches off from the binding member 22 needs only to be increased in the vicinity of the one arrangement end across the battery cells 2 at which the connecting position 28 hardly changes as the battery cell 2 at the connecting destination of the harness 21 becomes located closer to the elastic body 5A, and the flexure amount of the harness 21 that branches off from the binding member 22 needs only to be increased in the vicinity of the other arrangement end as the battery cell 2 at the connecting destination of the harness 21 becomes located closer to the elastic body 5B.

Fourth Embodiment

Figure 9:
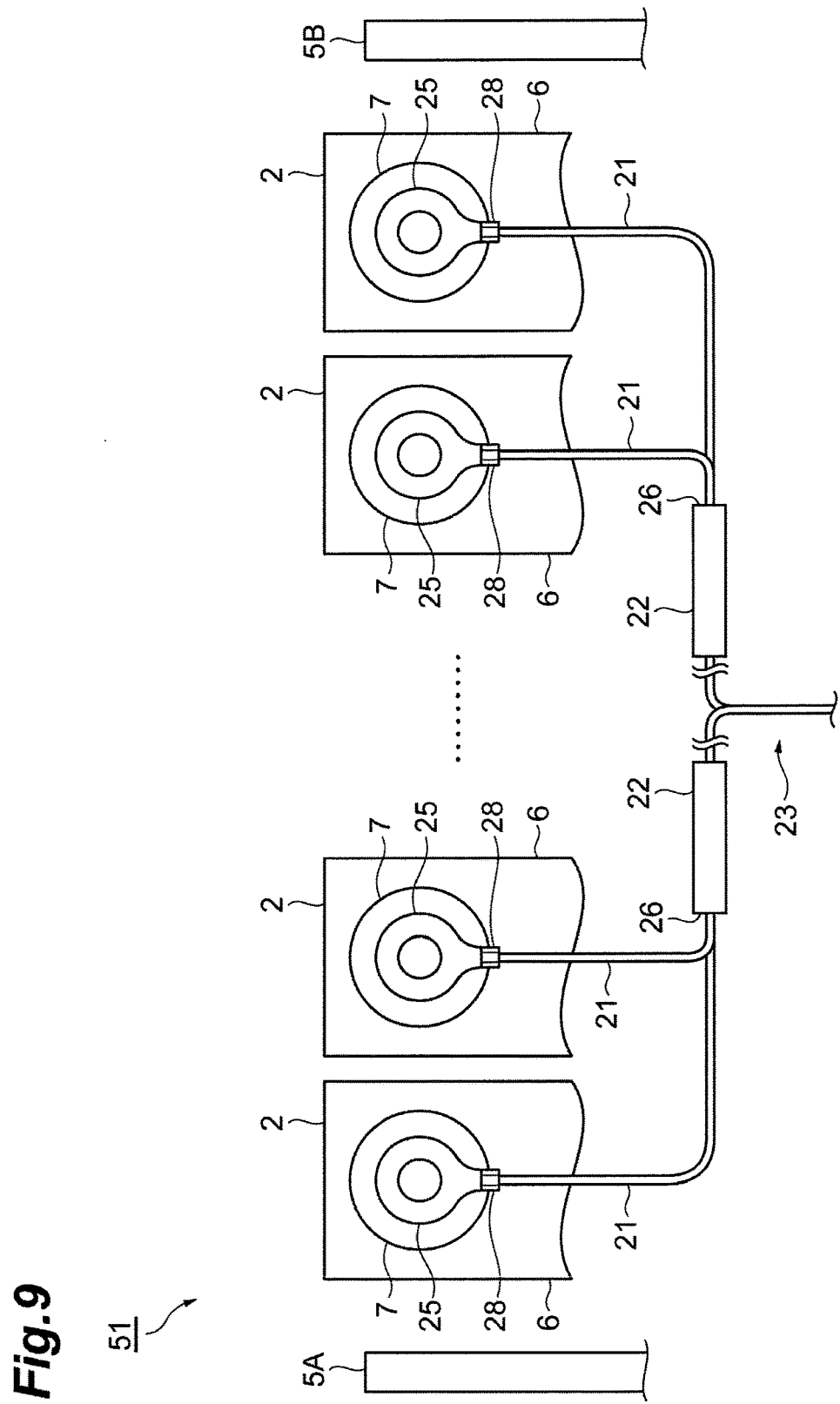
FIG. 9 is an enlarged schematic view of key parts illustrating an assembled state of harnesses of a battery module according to a fourth embodiment.

FIG. 9 is an enlarged schematic view of key parts illustrating an assembled state of harnesses of a battery module according to a fourth embodiment. As illustrated in FIG. 9, a battery module 51 according to a fourth embodiment is different from the battery module according to the third embodiment with regard to a position at which a harness bundle 23 is led.

To be more specific, in the battery module 51, an elastic body 5A is disposed at one arrangement end of an array 3, and an elastic body 5B is disposed at the other arrangement end. The harness bundle 23 is led from a middle portion of the array 3 in an arranging direction toward the elastic body 5A disposed at the one arrangement end and toward the elastic body 5B disposed at the other arrangement end. The position at which the harness bundle 23 is led may be unevenly biased to either of the one arrangement end or the other arrangement end with respect to the central position of the array 3 in the arranging direction.

In the battery module 51, a binding position 26 in the harness bundle 23 directed to the elastic body 5A is located at a side opposite to the elastic body 5A disposed at the one arrangement end relative to a connecting position 28, and a binding position 26 in the harness bundle 23 directed to the elastic body 5B is located at a side opposite to the elastic body 5B disposed at the other arrangement end relative to a connecting position 28. Thereby, a harness 21 branching off from each binding member 22 has a flexure between the binding position 26 and the connecting position 28. Therefore, like the aforementioned embodiments, even when swelling occurs at a battery cell 2, and the connecting positions 28 are displaced to the vicinity of the elastic bodies 5A and 5B from initial positions, the flexures of the harnesses 21 are maintained, and an excessive load such as a tensile force can be prevented from being applied to the harnesses 21, and thus the occurrence of a failure such as disconnection is prevented.

In the present embodiment, like the third embodiment, flexure amounts of the harnesses 21 that branch off from the binding members 22 may be increased as the battery cells 2 at the connecting destinations of the harnesses 21 become located closer to the elastic bodies 5A and 5B. In addition, a deformation amount of the elastic body 5A when the battery cell 2 swells (a crushing amount in a restraining direction of the battery cell 2) may be equal to or greater than a deformation amount of the elastic body 5B when the battery cell 2 swells.

Fifth Embodiment

FIG. 10 is an enlarged schematic view of key parts illustrating an assembled state of harnesses of a battery module according to a fifth embodiment. As illustrated in FIG. 10, a battery module 61 according to a fifth embodiment is different from the battery module according to the first embodiment with regard to a position at which an elastic body 5 is disposed and positions at which harness bundles 23 are led.

To be more specific, in the battery module 61, an elastic body 5A is disposed at one arrangement end of an array 3, and an elastic body 5B is disposed at the other arrangement end. A harness bundle 23A running along electrode terminals 7 at one side of battery cells 2 in the array 3 is led from the other arrangement end of the array 3 toward the elastic body 5A, and a harness bundle 23B running along electrode terminals 7 at the other side is led from the one arrangement end of the array 3 toward the elastic body 5B.

In the battery module 61, a binding position 26 in the harness bundle 23A directed to the elastic body 5A is located at a side opposite to the elastic body 5A disposed at the one arrangement end relative to a connecting position 28. In addition, a binding position 26 in the harness bundle 23B directed to the elastic body 5B is located at a side opposite to the elastic body 5B disposed at the other arrangement end relative to a connecting position 28, and has a relation reversed to the harness bundle 23A in an arranging direction of the array 3

Thereby, in any of the harness bundles 23A and 23B, the harness 21 branching off from each binding member 22 has a flexure between the binding position 26 and the connecting position 28. Therefore, like the aforementioned embodiments, even when swelling occurs at the battery cell 2, and the connecting positions 28 are displaced from initial positions to the vicinities of the elastic bodies 5A and 5B, the flexures of the harnesses 21 are maintained, and an excessive load such as a tensile force can be prevented from being applied to the harnesses 21, and thus the occurrence of a failure such as disconnection is prevented.

In the present embodiment, like the third embodiment, as the battery cells 2 at the connecting destinations of the harnesses 21 become located closer to the elastic bodies 5A and 5B, flexure amounts of the harnesses 21 that branch off from the binding members 22 may increase. In addition, a deformation amount of the elastic body 5A when the battery cell 2 swells (a crushing amount in a restraining direction of the battery cell 2) may be equal to or greater than a deformation amount of the elastic body 5B when the battery cell 2 swells.

Other Modifications

The present invention is not limited to the aforementioned embodiments. For example, in the aforementioned embodiments, the harness 21 includes a harness used to detect a voltage of the battery cell 2, but a use of the harness is not limited thereto. The mark 27 indicating the binding position 26 of the harnesses 21 need not necessarily be provided. The flexure amounts of the harnesses 21 that branch off from the binding member 22 may be equal to each other among the harnesses 21. In this case, the configuration of the harness bundle 23 can be simplified.

REFERENCE SIGNS LIST 1, 31, 41, 51, 61 Battery module; 2 Battery cell; 3 Array; 4 Restraining member; 5, 5A, 5B Elastic body; 7 Electrode terminal; 21 Harness; 22 Binding member; 23, 23A, 23B Harness bundle; 24 Coating member (binding member); 25 Connecting terminal; 26 Binding position; 27 Mark; 28 Connecting position.

The invention claimed is:

1. A battery module comprising:
an array formed by arranging a plurality of battery cells;
an elastic body disposed at one arrangement end of the array and configured to be compressed when swelling of the plurality of battery cells occurs in an arranging direction of the plurality of battery cells;
a restraining member configured to restrain the array via the elastic body in the arranging direction of the plurality of battery cells;
a plurality of harnesses configured to extend in the arranging direction and having connecting terminals at tips thereof connected to electrode terminals of the plurality of battery cells; and
a binding member configured to bind the plurality of harnesses into a harness bundle, wherein
a binding position of the plurality of harnesses, which is caused by the binding member, is located at a side opposite to the elastic body relative to a connecting position between each electrode terminal and each connecting terminal such that the connecting position is between the elastic body and the binding position, and
a harness of the plurality of harnesses is branched off from the binding member in a direction towards one of the electrode terminals and has a flexure between the binding position and the connecting position.

2. The battery module according to claim 1, wherein the plurality of harnesses are led from the other arrangement end of the array for the plurality of battery cells toward the elastic body.

3. The battery module according to claim 1, wherein the elastic body is disposed between the plurality of battery cells in the array, and the plurality of harnesses are led from one arrangement end and the other arrangement end of the array for the battery cells toward the elastic body.

4. The battery module according to claim 1, wherein the elastic body is disposed at the one arrangement end and the other arrangement end of the array for the plurality of battery cells, and
the plurality of harnesses are led from the other arrangement end toward the elastic body disposed at the one arrangement end.

5. The battery module according to claim 1, wherein the elastic body is disposed at one arrangement end and the other arrangement end of the array for the plurality of battery cells, and
the plurality of harnesses are led from a middle portion of the array in the arranging direction toward the elastic body disposed at the one arrangement end and toward the elastic body disposed at the other arrangement end.

6. The battery module according to claim 4, wherein a deformation amount of the elastic body disposed at the one arrangement end when the plurality of battery cells swell is greater than that of the elastic body disposed at the other arrangement end when the plurality of battery cells swell.

7. The battery module according to claim 1, wherein a flexure amount of the harness that branches off from the binding member increases the closer a battery cell of the plurality of battery cells is to the elastic body in the arranging direction.

8. The battery module according to claim 1, wherein a mark indicating the binding position caused by the binding member is provided for each of the plurality of harnesses.

9. The battery module according to claim 1, wherein the plurality of harnesses are harnesses used to detect voltages of the plurality of battery cells.

10. The battery module according to claim 5, wherein a deformation amount of the elastic body disposed at the one arrangement end when the plurality of battery cells swell is greater than that of the elastic body disposed at the other arrangement end when the plurality of battery cells swell.

11. The battery module according to claim 1, wherein the elastic body is disposed between the one arrangement end of the array and the restraining member in the arranging direction of the plurality of battery cells.

* * * * *